(12) United States Patent
Kauranen (10) Patent No.: US 7,670,163 B2
(45) Date of Patent: Mar. 2, 2010

(54) ELECTRIC CONNECTION AND ELECTRIC COMPONENT

(75) Inventor: Matti Kauranen, Espoo (FI)

(73) Assignee: ABB Oy, Helsinki (FI)

( * ) Notice: Subject to any disclaimer, the term of this patent is extended or adjusted under 35 U.S.C. 154(b) by 349 days.

(21) Appl. No.: 11/783,094

(22) Filed: Apr. 5, 2007

(65) Prior Publication Data

US 2007/0247027 A1     Oct. 25, 2007

(30) Foreign Application Priority Data

Apr. 20, 2006    (FI)   ............................... 20065247

(51) Int. Cl.
*H01R 13/64*      (2006.01)

(52) U.S. Cl. ...................... 439/212; 439/949

(58) Field of Classification Search ................ 439/212, 439/213, 949; 361/648, 749, 775, 830; 174/70 B, 174/71 B, 72 B, 76 B, 99 B, 268

See application file for complete search history.

(56) References Cited

U.S. PATENT DOCUMENTS

| | | | |
|---|---|---|---|
| 3,166,650 A * | 1/1965 | Heidrich | ................ 200/52 R |
| 4,867,696 A * | 9/1989 | Demler et al. | ............. 439/212 |
| 5,132,896 A | 7/1992 | Nishizawa et al. | |
| 5,694,301 A | 12/1997 | Donegan et al. | |
| 6,010,375 A * | 1/2000 | Higuchi | .................. 439/763 |
| 6,024,589 A * | 2/2000 | Hahn et al. | ............... 439/212 |
| 6,175,509 B1 * | 1/2001 | Koch | ........................ 361/809 |
| 6,203,343 B1 * | 3/2001 | Chevassus-More et al. | . 439/210 |
| 6,259,617 B1 | 7/2001 | Wu | |
| 6,402,530 B1 * | 6/2002 | Saito et al. | ................. 439/76.2 |
| 6,428,335 B1 * | 8/2002 | Bader et al. | ................ 439/213 |
| 2003/0092308 A1 * | 5/2003 | Bertness | .................... 439/388 |
| 2007/0109715 A1 * | 5/2007 | Azuma et al. | ............ 361/299.3 |
| 2007/0247027 A1 * | 10/2007 | Kauranen | ................... 310/330 |

FOREIGN PATENT DOCUMENTS

| | | |
|---|---|---|
| EP | 0 578 108 A1 | 1/1994 |
| EP | 0 652 630 A2 | 5/1995 |
| EP | 1 172 908 A2 | 1/2002 |
| EP | 1 174 992 A2 | 1/2002 |
| EP | 1 445 853 A2 | 8/2004 |
| JP | 1-137615 A | 5/1989 |
| JP | 3-289346 A | 12/1991 |
| JP | 4-133669 A | 5/1992 |

OTHER PUBLICATIONS

Finnish Search Report dated Nov. 24, 2006 (with English translation of category of cited document).
Finnish Office Action dated Nov. 27, 2006.

* cited by examiner

*Primary Examiner*—James Harvey
(74) *Attorney, Agent, or Firm*—Buchanan Ingersoll & Rooney PC (57) ABSTRACT

An electric connection and an electric component, the electric component comprising connectors for connecting the electric component. The connectors are formed of a first and a second electrically conductive laminar conductor, which are placed opposite each other and isolated from one another with an insulator, whereby the electric component is arranged to be connected through the plane surfaces of the laminar conductors, and the insulator is arranged between the laminar conductors such that the insulator comprises at least one free plane surface.

20 Claims, 13 Drawing Sheets

ELECTRIC CONNECTION AND ELECTRIC COMPONENT

BACKGROUND OF THE INVENTION

The invention relates to an electric connection, and particularly to an electric connection according to the preamble of claim 1, which allows a low-inductance connection between two or more electric parts. The invention also relates to an electric component according to the preamble of claim 9, which allows implementing the connection of the invention. The connection and the electric component are particularly applicable to the intermediate circuit of a frequency converter and to other corresponding connections.

The electric circuit of modern high-frequency transistor intermediate circuits must be as low-inductance as possible so that quick voltage variations do not cause interference to the operation of the transistors connected to this intermediate circuit. In connection with a frequency converter, an intermediate circuit comprises, in a known manner, voltage busbars of the intermediate circuit as well as capacitors and switch components connected to it, such as IGB transistors. Other corresponding devices in which the aim is low inductance include inverters, welding devices, UPS devices, various power sources, power coefficient corrective circuits, motor soft starters and control devices of induction furnaces.

With regard to the intermediate circuit, component manufacturers aim at making the internal connections of their component as low-inductance as possible. Some component manufacturers give the components they manufacture an inductance and resistance value, on the basis of which it is possible to determine for the component a switching frequency limit value with which the component still functions. The components are generally connected externally, depending on the magnitude of the current and the power to be transmitted, either by soldering on a circuit board or with a screw connection to a busbar system.

Publications U.S. Pat. No. 6,259,617, EP1445853 and U.S. Pat. No. 5,132,896 disclose intermediate circuit arrangements with which the aim is low intermediate circuit inductance. In all of these publications, it has been noted that, generally speaking, a low-inductance busbar system has been achieved by positioning the plus and minus current paths of the intermediate circuit on top of each other as symmetrically as possible. The problem of the publications is, however, that the connection structures between busbar systems and components generate undesired inductance for the current path of the intermediate circuit.

BRIEF DESCRIPTION OF THE INVENTION

An object of the invention is thus to provide a connection form and an electric component to be used particularly in connection with the intermediate circuit of a frequency converter in such a way that the above-mentioned problem can be solved. The object of the invention is achieved with a connection and an electric component that are characterized by what is stated in the independent claims. Preferred embodiments of the invention are disclosed in the dependent claims.

The connection of the invention is based on the idea that the connections between the electric parts is made as low-inductance as possible when the connection keeps the shape of the current busbars of the intermediate circuit. Thus, the connections are implemented through the plane surfaces of laminar conductors, in other words by connecting laminar surfaces of laminar conductors to each other at the same time as the insulation layer between these conductors continues uninterrupted throughout the connection.

An advantage of the connection and the component according to the invention is that the connection allows the principle of low inductivity to be applied in the whole intermediate circuit. By means of the connection, a low-inductance busbar system can be connected to low-inductive electric components in such a way that the advantages of these components, with regard to their low inductance, can be utilized in a maximal way.

The implementation of the connection and the components needed for it are also advantageous, and therefore, compared with prior art, the connection of the invention does not require any significant additional investment.

The connection of the invention also enables physical implementation of the connection in various ways as required in each particular case.

BRIEF DESCRIPTION OF THE FIGURES

The invention will now be described in more detail in connection with preferred embodiments, referring to the attached drawings, of which.

DETAILED DESCRIPTION OF THE INVENTION

Figure 1:
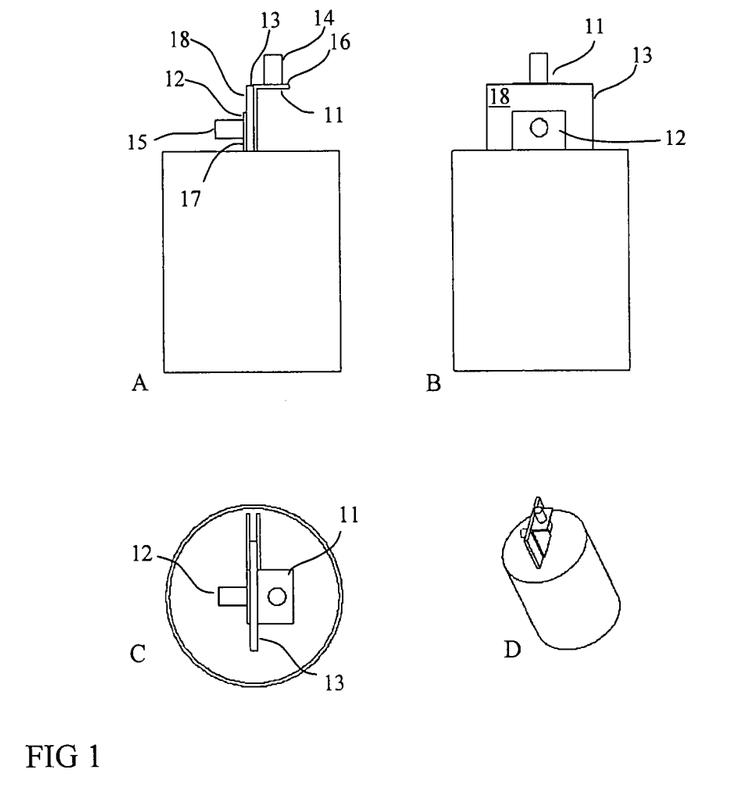
FIGS. 1, 2, 4, 6, 8 and 10 show embodiments of the electric component of the invention.

FIG. 1 illustrates an electric component according to an embodiment of the invention, being shown here as a capacitor. The capacitor itself is illustrated as a cylindrical piece, while the invention directs in greater detail to the connectors of the component. The basic structure of the electric component of the invention becomes apparent from FIG. 1 A. The electric component comprises connectors 11, 12 for connecting the electric component to the rest of the electric circuit. This electric circuit, in which the component of the invention is particularly usable, is an intermediate circuit. It is also feasible to use an accumulator instead of a capacitor, so that the accumulator functions similarly to a capacitor as an energy reserve in certain applications. Such an application is for example a UPS system, in which it is specifically an accumulator or a set of accumulators that functions as the energy reserve.

The connectors of the electric component of the invention are formed of a first and a second electrically conductive laminar conductors 11, 12, which are placed opposite each other and isolated from one another with an insulation means 13. In accordance with the invention, the electric component is arranged to be connected through the plane surfaces 16, 17 of the laminar conductors. These plane surfaces are formed of the outer or inner surfaces of the laminar conductors. The embodiment of FIG. 1 shows how there are also fastening means 14, 15, such as screw caps, placed on these plane surfaces to physically fasten the component. In FIG. 1, the fastening means, and at the same time, the plane surface used for connection is, with regard to one connector 16, the inner surface of a laminar conductor that is bent outwards to an angle of approximately 90 degrees, i.e. away from the other connector. The plane surface 17 intended for electrically connecting the other connector is, in turn, formed on the outer surface of the laminar conductor.

The electric component according to the invention further comprises an insulation means 13, which is arranged between the laminar conductors 11, 12 in such a way that the insulation means comprises at least one free plane surface 18. In FIG. 1, the free surface 18 of the insulation means is formed in such a way that the insulation means extends farther on the inner surface of the connector 11 than the connector 12 on the other side of the insulation means. As mentioned earlier, the connector 11 has a bend directed outwards. Thus, the insulation means extends substantially to this bend on the inner surface of the connector 11. The free surface of the insulation means is intended to receive the free surface of the other insulation means in electrically connecting the electric component.

In FIG. 1, the electric component is illustrated as a capacitor connectable to an intermediate circuit, in particular, in a low-inductive manner. The capacitor is shown in the partial view A of FIG. 1 from one side, in the partial view B from the front, in the partial view C from above, and in the partial view D as a perspective view. The shape of the cylinder may naturally be different from what is shown in the figure.

Figure 2:
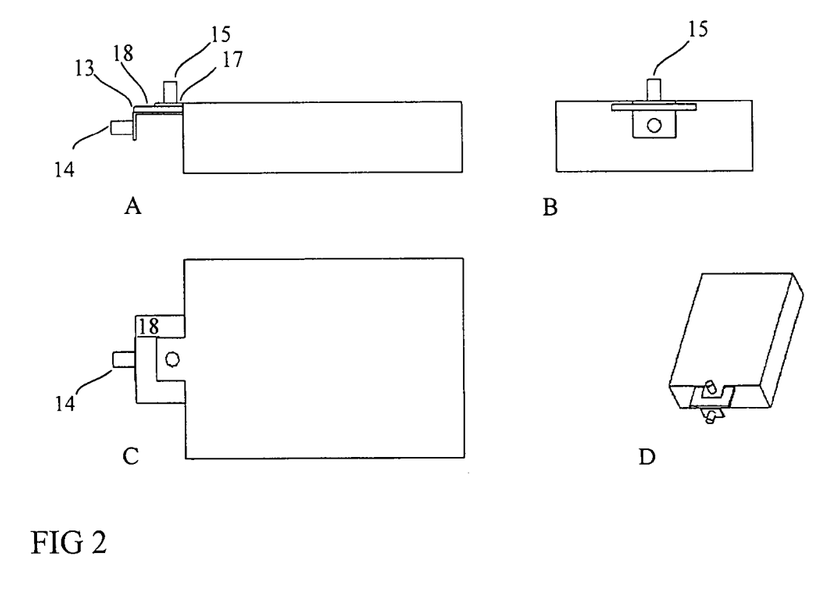

FIG. 2 shows an electric component the connector structure of which corresponds to the structure described in connection with FIG. 1. This component represents particularly an IGB transistor or transistor module and is also particularly intended to be connected to the intermediate circuit of a frequency converter in a low-inductance manner. It is clear that when the electric component is a controllable switch, such as an IGBT, it must also comprise other connectors apart from the two that are illustrated. With the connectors shown, the component is connected to the busbar system of the intermediate circuit, but the switch component must also comprise a control connector and an outlet connector. If the component is an IGBT module comprising two or more IGBT switches, it is natural that the number of such other connectors increases.

It can be seen from FIG. 2, and particularly from the partial view 2 C, how the laminar conductor 12 forming the connector is formed of a part of the shell structure of the component. It is also obvious that the insulation means extends, if required, to the inside of the electric component of the invention. The insulation means may also be formed by extending the insulation means internal to the component to the outside of the component between the connectors.

Figure 3:
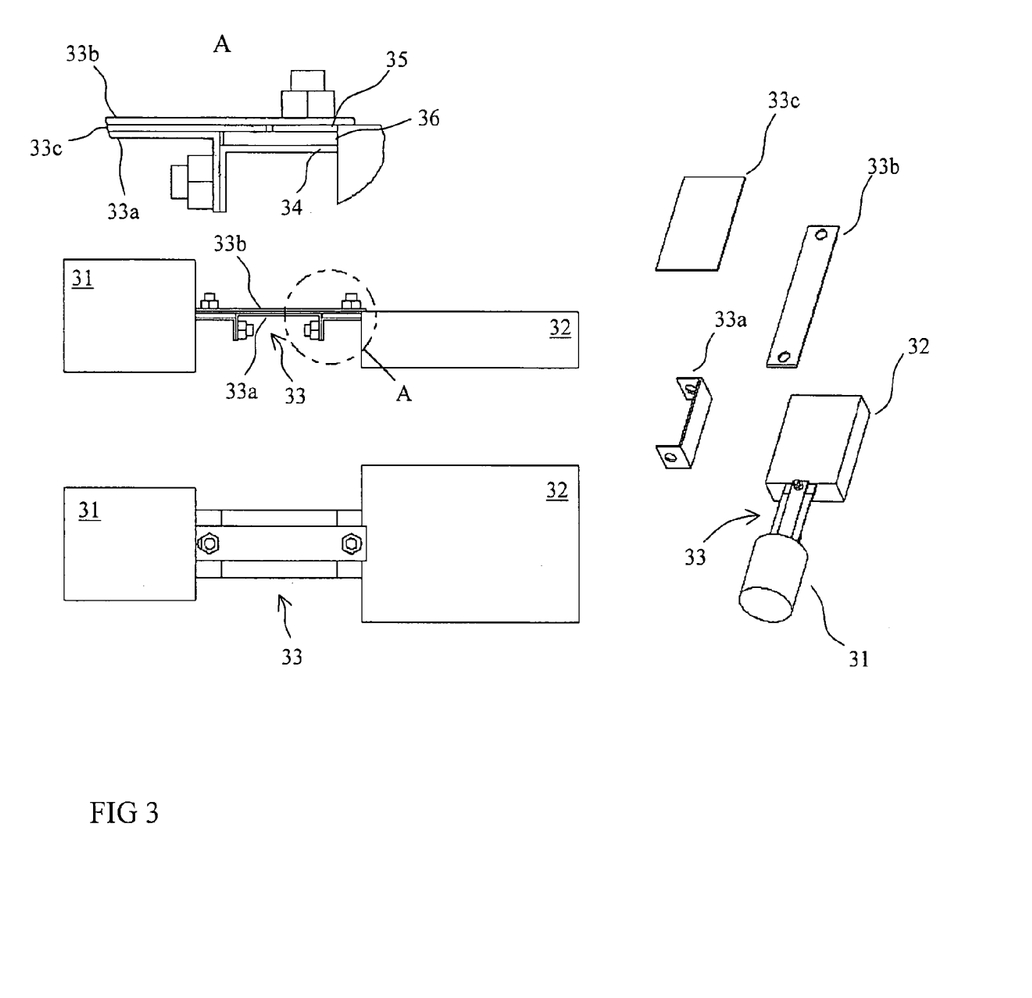
FIGS. 3, 5, 7, 9, 11 and 12 show embodiments of the connection of the invention in connection with electric components.

FIG. 3 shows an electric connection between the electric components according to FIGS. 1 and 2. In this connection, a capacitor 31 and an IGB transistor 32 are connected to the intermediate busbar system 33 in accordance with the invention. The switch component 32 of FIG. 3 comprises, for instance, two bridge-connected IGB transistors, whereby the assembly of FIG. 3 constitutes the intermediate circuit of a single-phase inverter and the components connected to it. Correspondingly, the switch component may comprise three pairs of bridge-connected components, with which the outlet of a three-phase frequency converter can be formed.

The partial blow-up A of FIG. 3 shows, in more detail, the connection of the invention between the busbar system 33 of the intermediate circuit and the electric component 32. FIG. 3 also shows pieces 33a, 33b and 33c used for forming the intermediate circuit 33.

As mentioned above, the components shown in FIGS. 1 and 2 are used in the connection of FIG. 3. According to the invention, the connections are formed through plane surfaces of electric parts. In the embodiment of FIG. 3, these electric parts of the connection are formed of a first and a second electrically conductive laminar conductor of the capacitor 31, the IGB transistor 32 and the busbar system 33 of the intermediate circuit. These laminar conductors are further isolated from each other with insulation means. The embodiment of FIG. 3 comprises two connections according to the invention, i.e. a connection between the busbar system and the IGBT and a connection between the busbar system and the capacitor, of which only the former is explained with reference to the partial blow-up A.

It becomes obvious from the partial blow-up of FIG. 3 how the first electric part, i.e. the busbar system 33 of the intermediate circuit, is formed of the first electrically conductive laminar conductor 33a and the second electrically conductive laminar conductor 33b that are placed opposite each other and isolated from each other with the first insulation part 33c.

In accordance with an embodiment of the invention, the second electric part is formed of a first and a second electrically conductive laminar conductor 34, 35 of the electric component, such as an IGBT, the conductors being placed opposite each other and isolated from each other with a second insulation means 36.

In accordance with the invention, the connection between the electric parts is formed in such a way that the first laminar conductor 33a of the first electric part is attached to the first laminar conductor 34 of the second electric part through the plane surfaces of the laminar conductors. Further, the second laminar conductor 33b of the first electric part is attached to the second laminar conductor 35 of the second electric part through the plane surfaces of the laminar conductors.

Further, in accordance with the invention, insulation means 33c, 36 of the first and the second electric part comprise at least one free plane surface, whereby the insulation means are arranged partly on top of each other by means of these free plane surfaces. By positioning the insulation means in accordance with the invention, the insulation layer continues uninterruptedly through the whole connection, whereby the conductors of the connection form a uniform laminar structure.

It becomes apparent from the partial blow-up A of FIG. 3 how the second busbar 33b of the busbar system is fastened on top of the busbar 35 with a nut, whereby the electric connection is formed through the plane surfaces. The busbar 33b of the busbar system is formed of a rectangular, conductive laminar piece. Correspondingly, the busbar 33a is attached to the busbar 34 with a nut. The free plane surface of the busbar 34 is formed by bending the end of the busbar outwards, whereby the inner surface of the bent part forms a free plane surface for the connection. With regard to its shape, the busbar 33a is a laminar busbar the both ends of which are bent to an angle of approximately 90 degrees.

The insulation means 36 extends, on top of the busbar 34, substantially to the bend, whereby a free surface is formed for the insulation means because the busbar 35 is shorter than the busbar 34. The end part of the insulation means 33c is positioned on this free surface of the insulation means 36 in such a way that the insulation means partly overlie each other between the busbars and form a uniform insulation structure at the point of the connection. The insulation means 33c is shown as a planar piece having substantially the same width as the other insulation means.

To simplify the shapes of the pieces of the busbar system 33 as much as possible it is preferable to make the thickness of the insulation means 33b correspond to the thickness of the connector 35, which allows the busbar 33b to be completely even.

As mentioned above, FIG. 3 shows two similar connections according to the invention for the same busbar system, of which the connection between the busbar system 33 and the electric component 32 has been described in detail while the connection of the busbar system 33 and the electric component 31 corresponds to the connection explained above.

Figure 4:
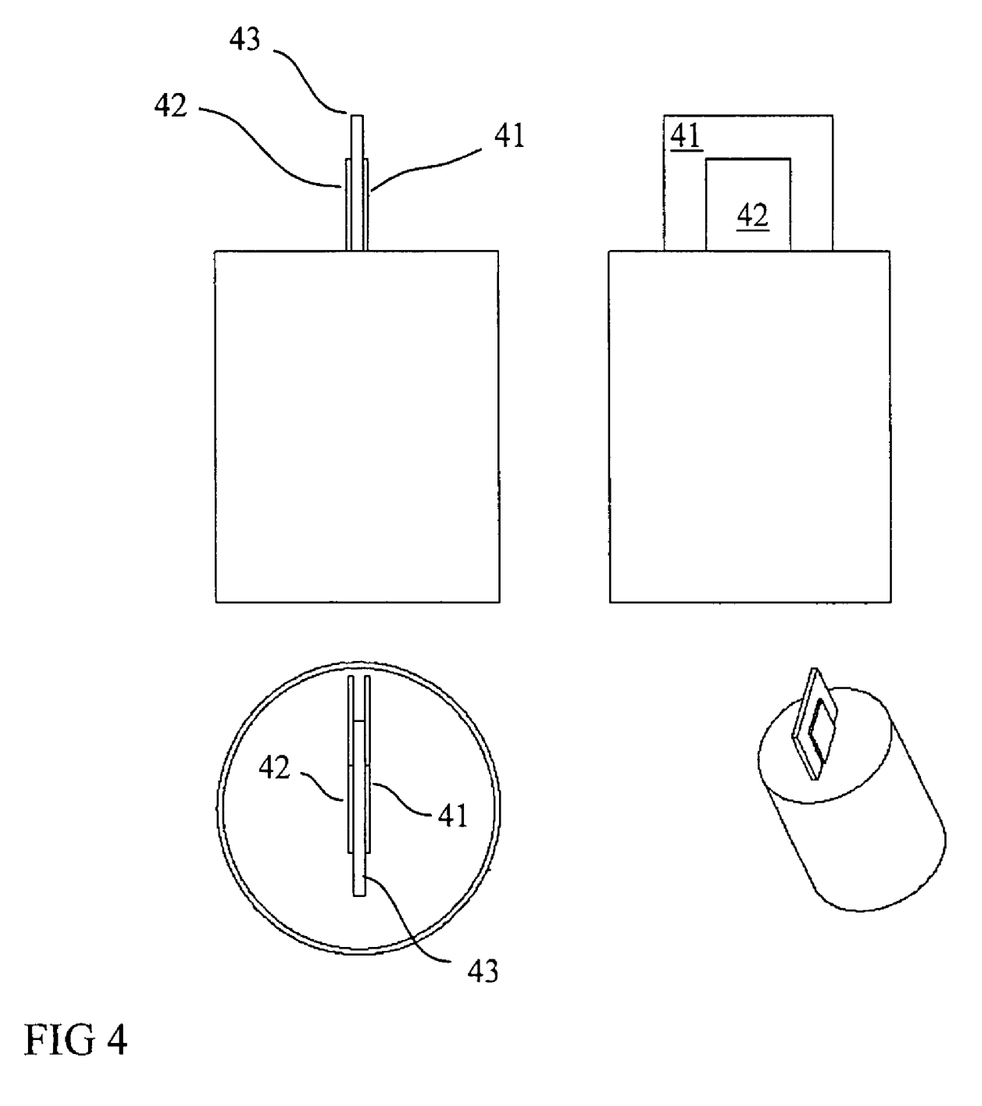

FIG. 4 shows an embodiment of the electric component according to the invention. In FIG. 4, the component is illustrated as a capacitor, but also other electric components, such as IGB transistors or other switch components or switch modules, may have the same connector structure. In this structure, connectors 41, 42 of the component are formed of planar plates, between which an insulation means 43 is positioned. In this embodiment of the invention, the insulation means extends farther than the connectors, seen from the component itself. The free planar surfaces of the connectors are thus formed on the outer surfaces of the connectors, while the inner surfaces are against the insulation means. In the embodiment, the insulation means of the component has two free surfaces positioned on both planar surfaces of the planar insulation means.

Figure 5:
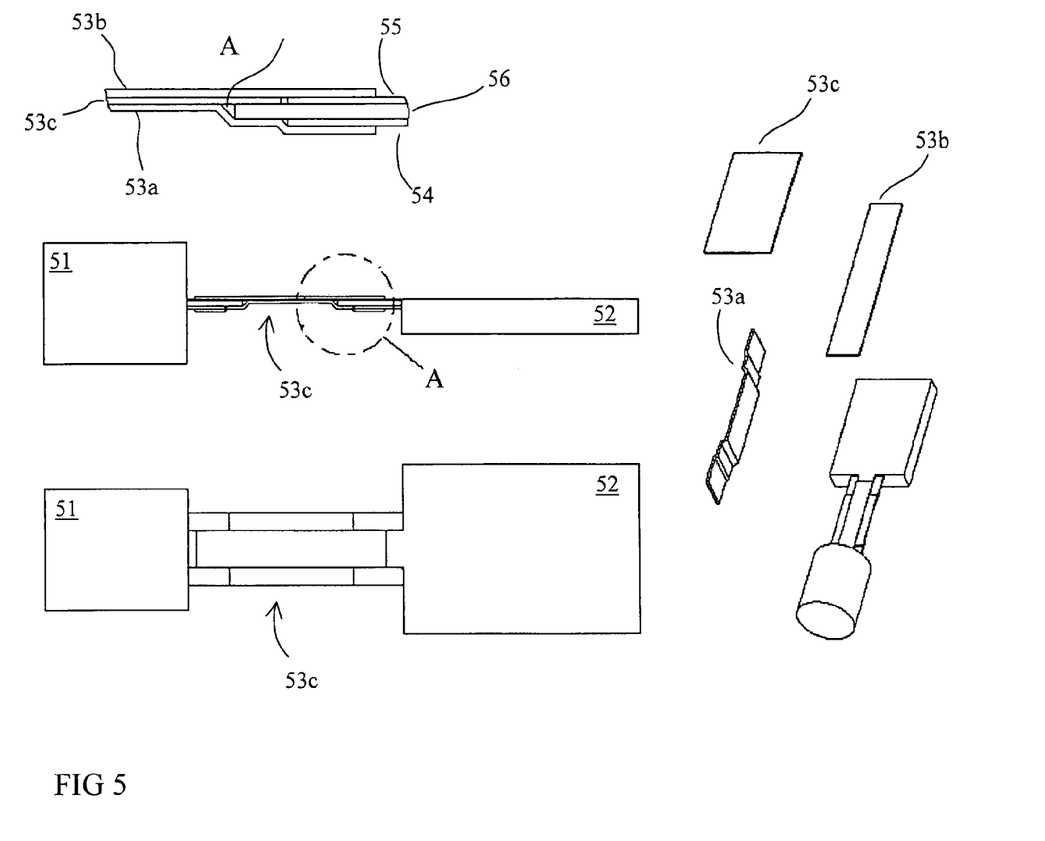

FIG. 5 shows the connections of a capacitor 51 and switch component 52 to a busbar system 53, comprising connectors according to FIG. 4. In particular, FIG. 5 shows a partial blow-up A of the connection between the busbar system 53 and the component 52. The busbar system comprises an insulation means 53c positioned between busbars 53a and 53b of the busbar system. The first conductive laminar conductor, i.e. the busbar 53b, of the electric part, i.e. the busbar system, is positioned in such a way that this plane surface forms an electric connection with the plane surface of the second electric part, i.e. a connector 55. The busbars 53b and 55 are thus partly on top of each other. An insulation means 56 positioned between connector busbars 54, 55 comprise a free planar surface, on top of which the insulation means 53c is arranged. It becomes apparent from the figure how the thicknesses of this insulation means 53c and the connector 55 are substantially the same, whereby the busbar 53b may be of completely planar shape.

The busbar 53a, which is connected to the busbar 54 through the planar surfaces in accordance with the invention, is positioned in such a way that the planar surface of the busbar 53a gets into contact with the planar surface of the busbar 54 to generate an electric contact. An electric contact is, in this case, typically made by soldering or welding. The busbar 53a is shaped in such a way that it presses against the connector 54, further against the insulation means 56, and still further against the insulation means 53c. Thus, the busbar 53a comprises bends of this kind, which allow the shortest possible distance between the busbar systems in connection with the connection to reduce the inductance.

It is seen from FIG. 5 how the busbar system is formed of simple pieces, the insulation means 53c and one busbar 53b being planar, rectangular pieces. The other busbar 53a comprises the above-described bends at its both ends.

FIG. 5 shows two connections according to the invention, of which only the one shown in the partial view A is explained, the other connection between the electric component 51 and the busbar system 53 being implemented in a corresponding manner.

Figure 6:
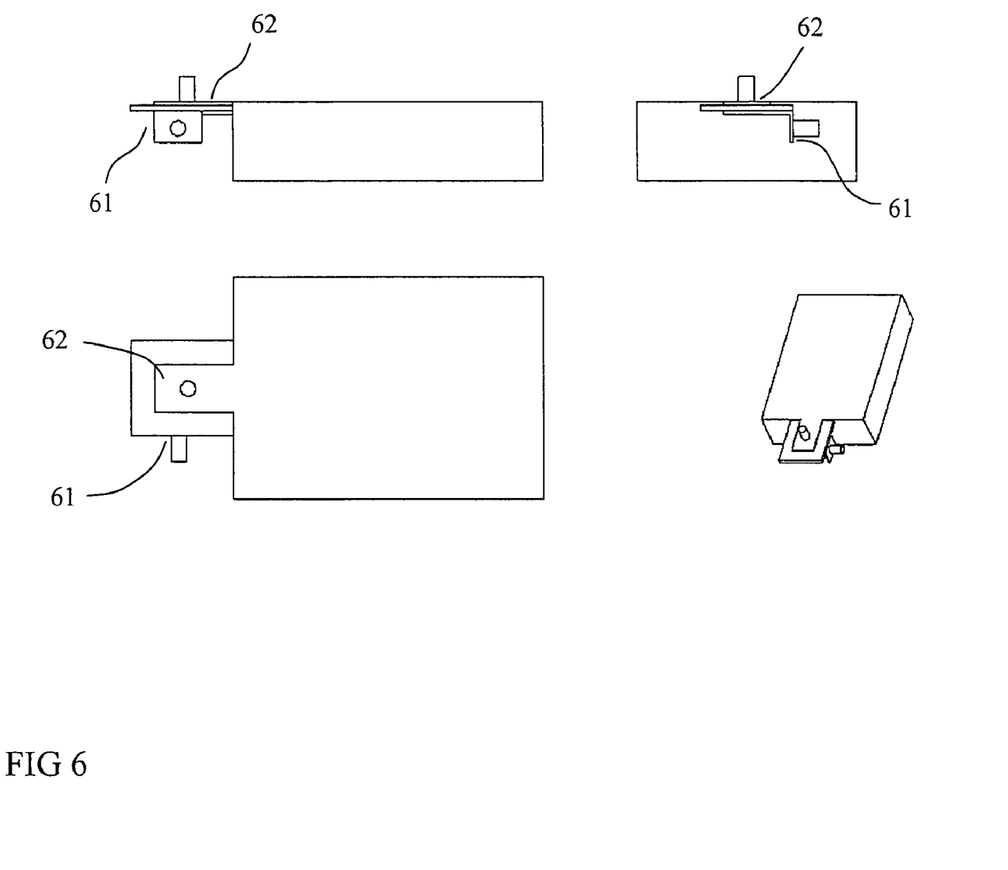

FIG. 6 shows an embodiment of the electric component of the invention. The electric component of this embodiment is a switch component, such as an IGB transistor or an IGB transistor module, in which only the features essential to the understanding of the invention are illustrated. This electric component corresponds to a great extent to the component of FIG. 2, with the exception that here one connector 61 formed of laminar conductors is positioned to point to the side at an angle of approximately 90 degrees. This modification allows positioning the components in certain cases in a more space-economical manner than before. Connection to the component shown in FIG. 6 can be implemented from the side direction relative to the longitudinal axis of the component when the free space intended for the connection is in this direction. The other connector 62 is positioned as in FIG. 2.

Figure 7:
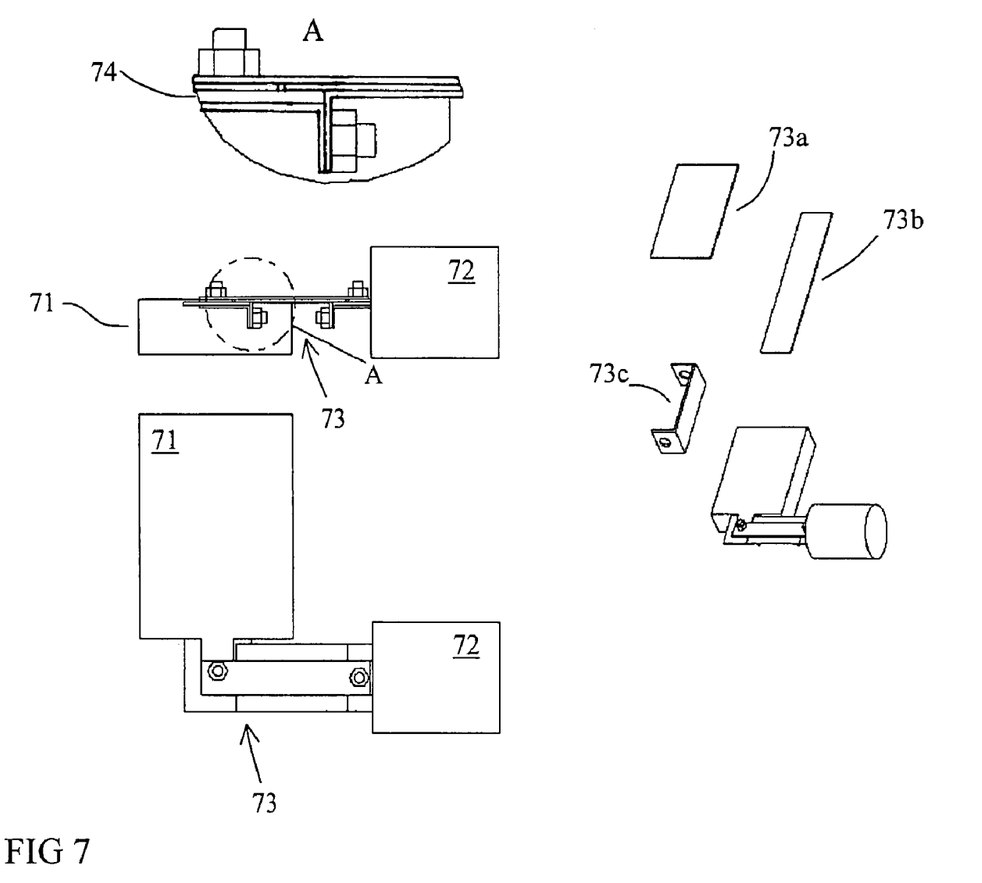

Connecting an electric component according to FIG. 6 to the busbar system of an intermediate circuit with a connection according to the invention is shown in FIG. 7. As regards its structure, this connection corresponds to the connection of FIG. 3. The difference compared with the connection of FIG. 3 is that this connection implements a bend provided with the component of FIG. 6. In the connection of FIG. 7 an electric component 71 is connected to a busbar system 73, and this connection is shown enlarged in the partial blow-up A. The partial blow-up A is illustrated from the direction of the connectors of the component 71 and indicates that the busbar system is directed to the side from the direction of the connectors of the component 71. For forming the busbar system and the connection, pieces 73a, 73b, 73c are used that correspond to the pieces in the connection of FIG. 3. By means of these pieces and connectors of the electric component, a structure is provided in which the laminar conductors are connected to each other through free plane surfaces and in which the insulation layer between the free plane surfaces extends over the connection, this insulation layer being formed of an insulation means 74 and the insulation piece 73a of the busbar system positioned partly on top of the free plane surface of the insulation means 74, and between the busbar 73b and the busbar 73c of the busbar system.

Figure 8:
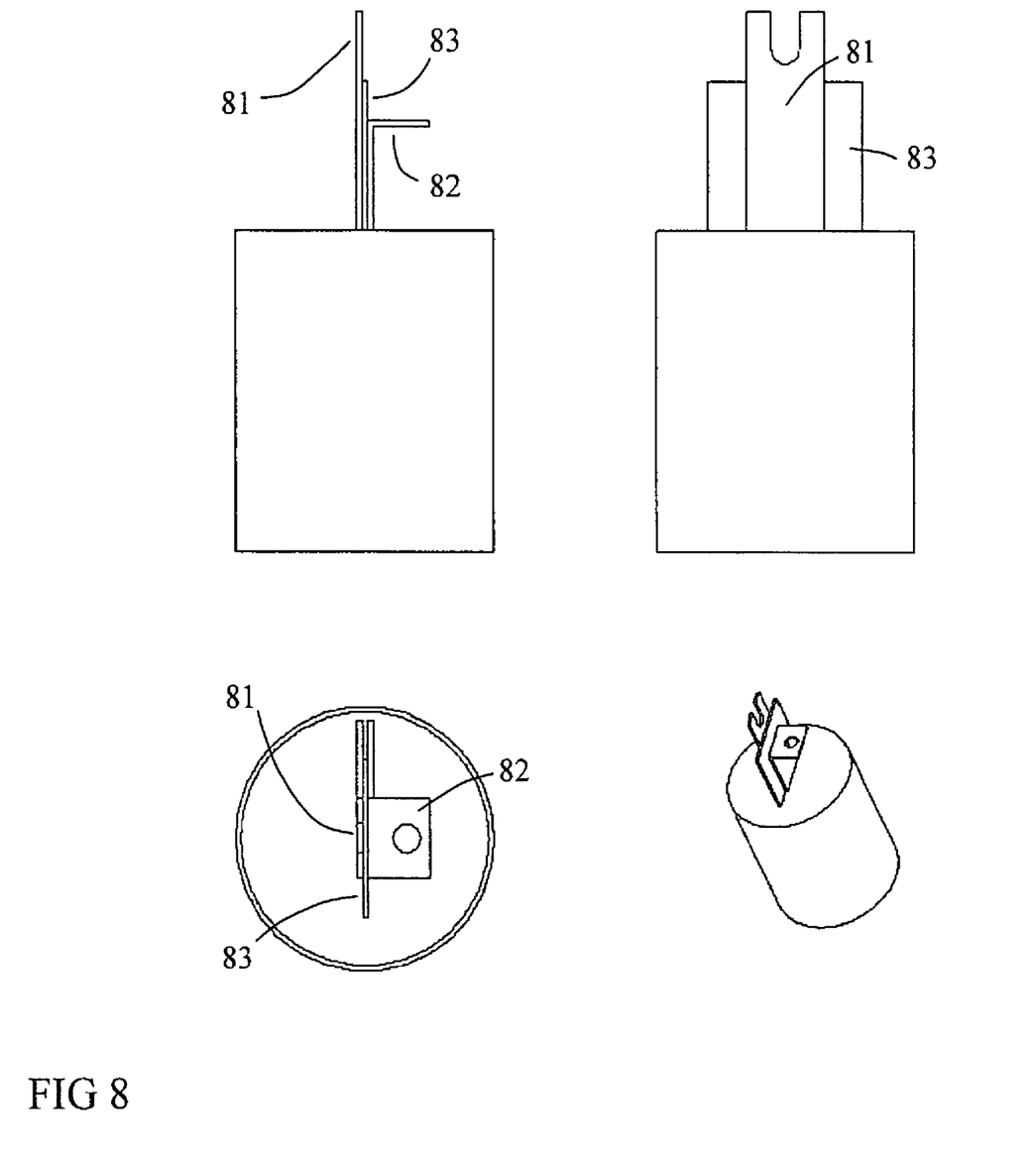

FIG. 8 shows an embodiment of the electric component of the invention, which allows connecting the electric component directly to another electric component with a connection according to the invention. The electric component of FIG. 8 is shown as a capacitor but the connectors of the electric component may also be arranged in a component of another type. The connectors 81, 82 of the electric component are formed of laminar connectors comprising at least one free plane surface to implement the connection. Between these laminar connectors, an insulation means 83 is positioned which also comprises at least one free planar surface. The connectors are formed in such a way that one of the connectors 81 is longer and, as a whole, a planar piece. The other connector 82, in turn, is shorter than the first one and comprises a bend of approximately 90 degrees outwards, i.e. away from the connector 81. The free plane surface intended for connecting is thus formed in the connector 82, in its bent part. The insulation means 83 is positioned between the connectors and extends on the surface of the connector 81 over the bend point of the connectors 82, forming here the free plane surface of the insulation means. Further, it becomes apparent from FIG. 8 that the insulation means is wider than the connectors.

Figure 9:
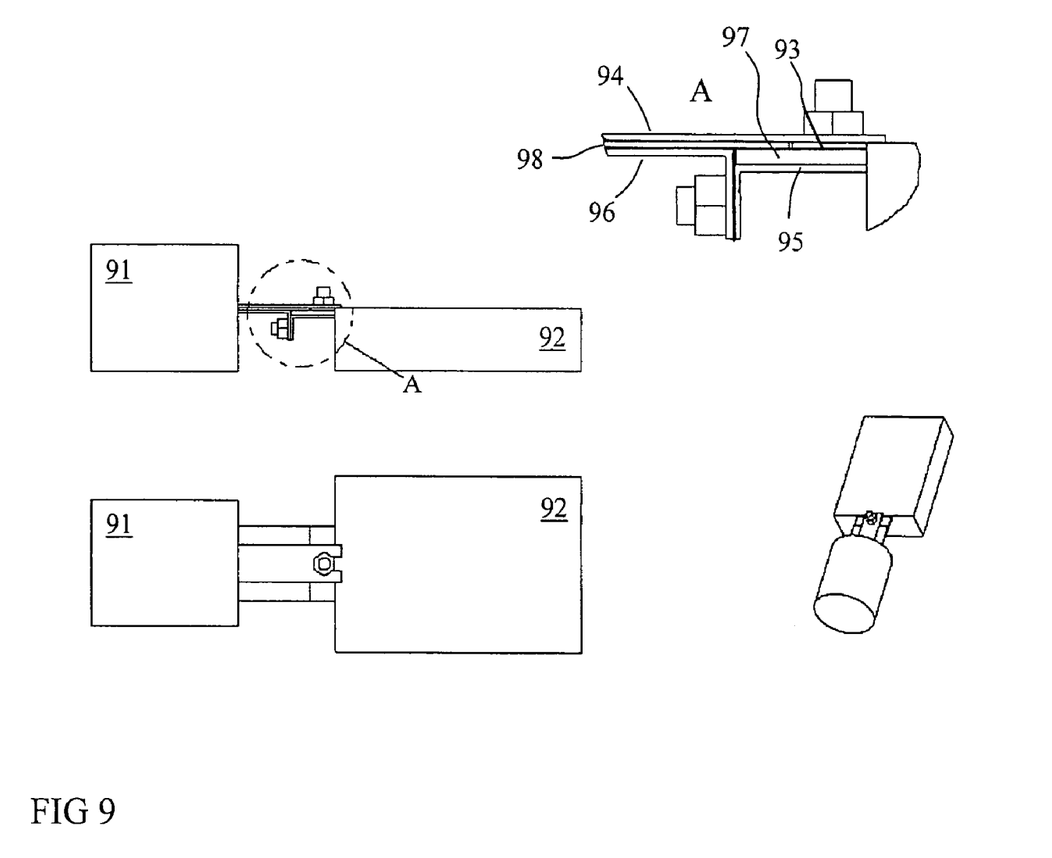

FIG. 9 shows a connection according to the invention between an electric component 91 according to the invention of FIG. 8 and an electric component 92 according to the invention of FIG. 2. In this connection, shown in more detail in the partial blow-up A of FIG. 9, the electric components 91, 92 are connected to each other directly via their connectors in a low-inductance manner. Connection members are formed in the connectors of FIG. 8 to carry out the connection. The connection member in the connector 81 is an opening of a U shape at the end of the connector, the connection member of the connector 82 being a hole. The purpose of these connection members is to receive the screw caps of FIG. 2 and thus to allow mechanical fastening by means of nuts.

It becomes apparent from the partial view of FIG. 9 how the connection between the electric components is carried out according to the invention. The free plane surfaces of laminar connectors 93, 95 of the electric component 92 are electrically connected to the plane surfaces of laminar connectors 94, 96 of the electric component 91. Insulation means 97, 98 between the connectors of the components, in turn, are connected to each other through the free plane surfaces, forming thus a continuous insulation layer at the point of the connection. The embodiment of the connection according to the invention shown in FIG. 9 directly forms a busbar system of an intermediate circuit without separate busbar structures. In this way, one connection is avoided in connecting two electric components.

Figure 10:
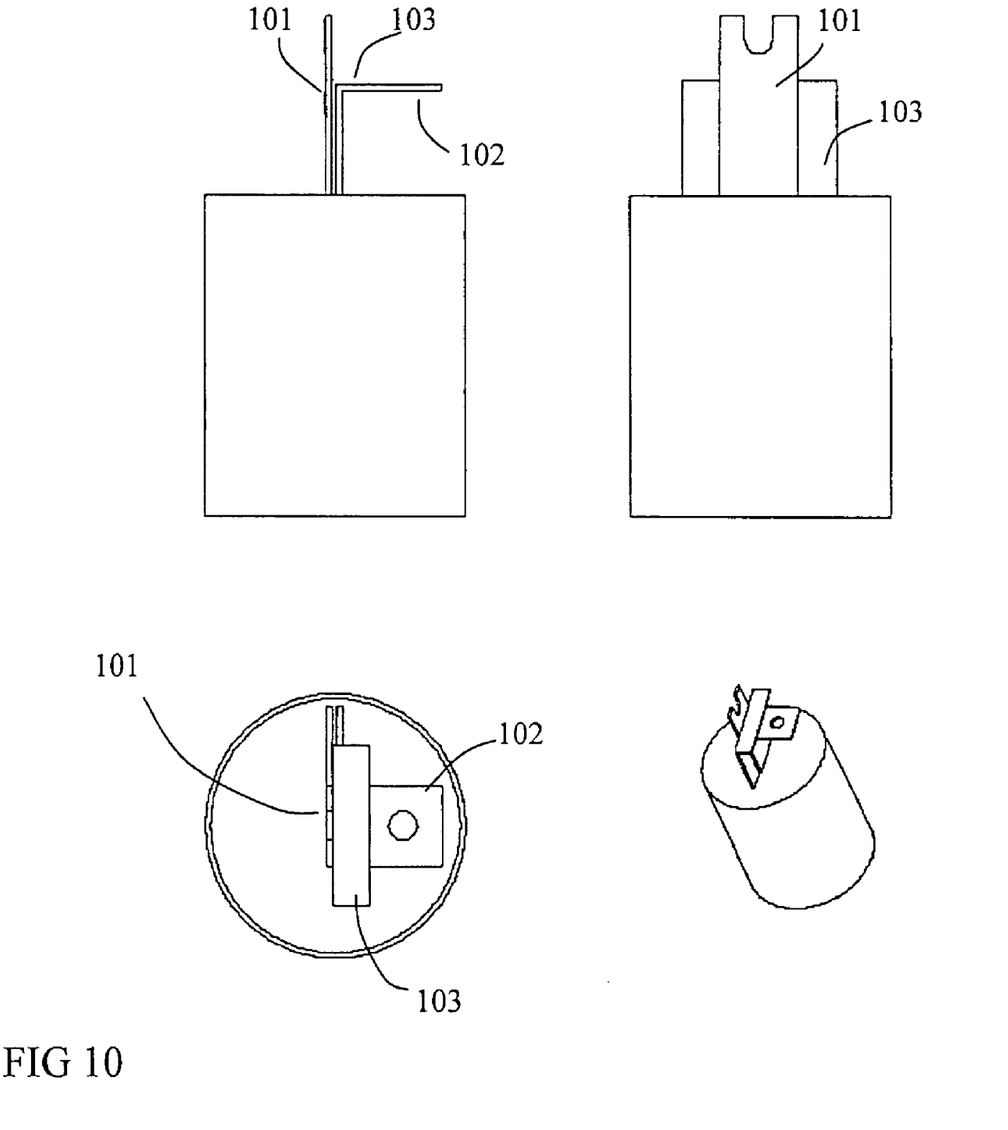

FIG. 10 shows an embodiment of the electric component of the invention, corresponding to a great extent to the embodiment of FIG. 8. In this embodiment one laminar connector 101 is, in a straight manner, directed away from the component, while the other connector 102 has a bend of about 90 degrees. An insulation means between the connectors extends over the bend and continues on the surface of the bent connector 102, leaving, however, the end of the plane surface of the connector 102 free. Thus, a free surface is formed in the insulation means 103, being in the direction of the bent plane of the connector 102.

Figure 11:
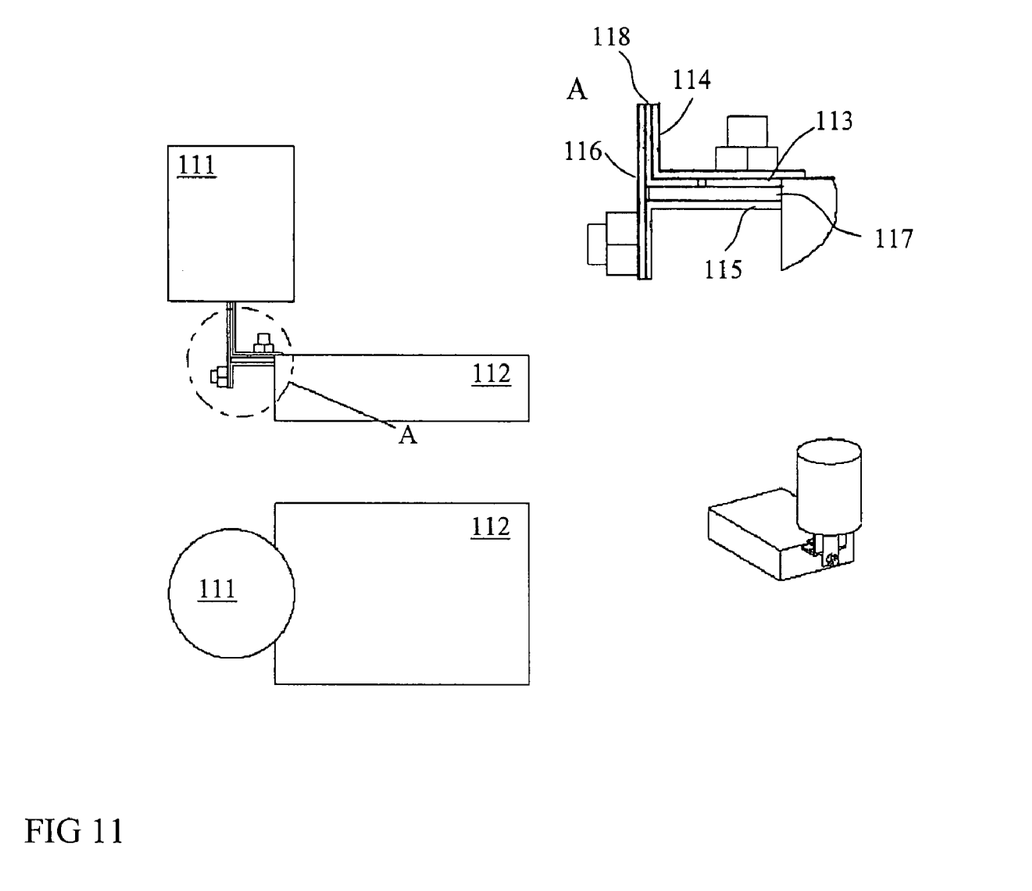

FIG. 11 shows a connection between the electric component of FIG. 10 and the electric component of FIG. 2, implemented in accordance with the invention. The electric components, which are a capacitor 111 and an IGB transistor 112 in the embodiment of FIG. 11, are connected to each other without a separate busbar structure. As in the case of FIG. 9, also in FIG. 11 the busbar system of the voltage intermediate circuit is thus formed of the connectors of the components.

The partial view A of FIG. 11 shows the structure of the connection in greater detail. In this connection, connectors 113, 115 of the electric component 112 are connected to connectors 114, 116 of the electric component 111 through the plane surfaces of the connectors, whereby insulation means 117, 118 of the components are partly on top of each other, forming a continuous insulation layer for the connection.

Figure 12:
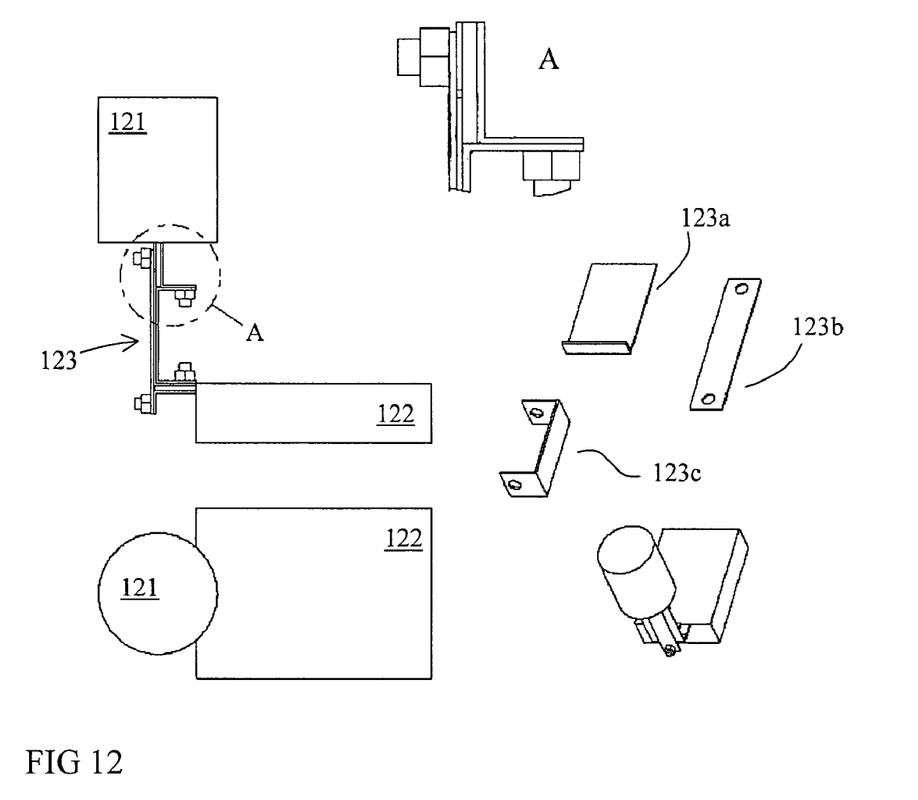

FIG. 12 shows connections according to the invention, implemented with electric components of the invention. In this embodiment, a capacitor 121 and a switch component 122 are connected to each other with a busbar system 123 formed of busbars 123b, 123c and an insulation means 123a between the busbars. FIG. 12 represents a modification of the structure of FIG. 3. In this embodiment, a bend of about 90 degrees has been provided between the components by placing the components of the busbar system as shown in FIG. 12 and by forming a bend of about 90 degrees in the insulation means 123a. The partial view of FIG. 12 shows a connection between the electric component 121 and the busbar system which corresponds substantially to the partial view A of FIG. 3.

The bent portion of the insulation means 123a is positioned in the connection between the component 122 and the busbar system in such a way that the bent part forms the free surface of the insulation means that is against the free surface of the insulation means of the component 122.

Figure 13:
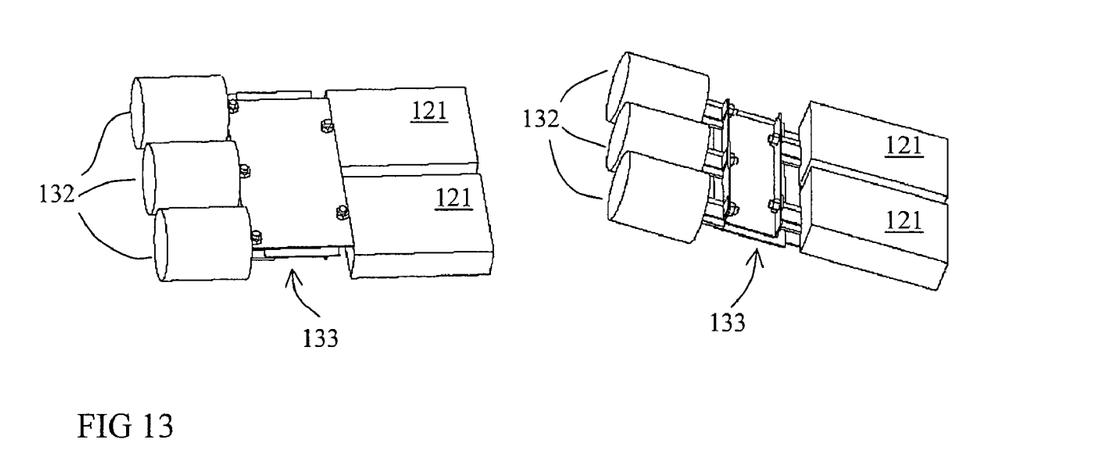
FIGS. 13, 14, 15 and 16 show several electric components of the invention being connected to a shared busbar system.

FIG. 13 shows an assembly in which two electric components, such as IGB transistors 131, according to the invention and three components 132, such as capacitors, according to the invention are connected to a shared intermediate circuit 133 with connections according to the invention. As regards their shapes, the connections are similar to those in the embodiment of FIG. 3. The busbar system of the intermediate circuit is here made wider in such a way that connecting all said components with connections according to the invention becomes possible. An assembly according to FIG. 13 allows increasing the capacitance of the intermediate circuit because the capacitors 132 are connected in parallel. Increasing the number of switch components allows, in turn, implementation of several phase outputs. Correspondingly, also the structure of the input bridge of a frequency converter can be implemented with switch components.

Figure 14:
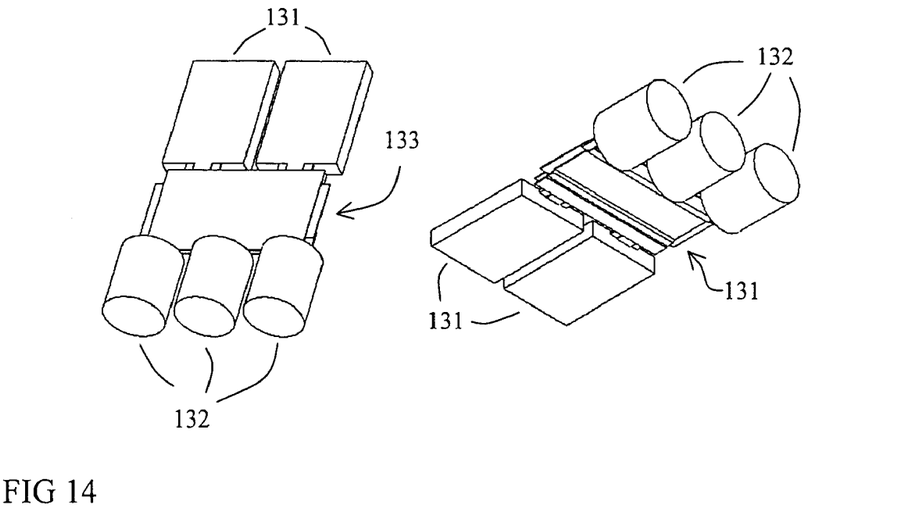

FIG. 14 shows an embodiment that corresponds to that of FIG. 13, except for the connections being implemented by applying the principle shown in FIG. 5.

Figure 15:
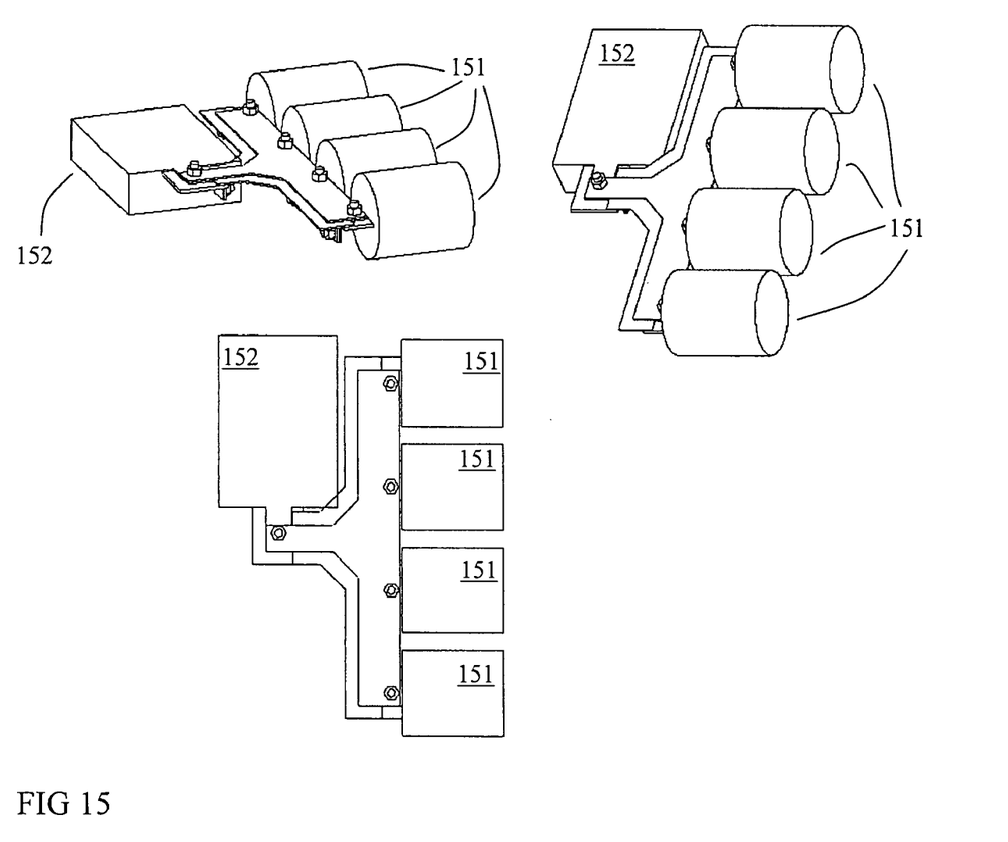

FIG. 15 shows an embodiment in which five electric components according to the invention are connected to a single intermediate circuit busbar system. Of these five components, four are shown as capacitors 151 and one as an IGB transistor or transistor module 152. The connections are formed by using the structure of FIG. 7.

Figure 16:
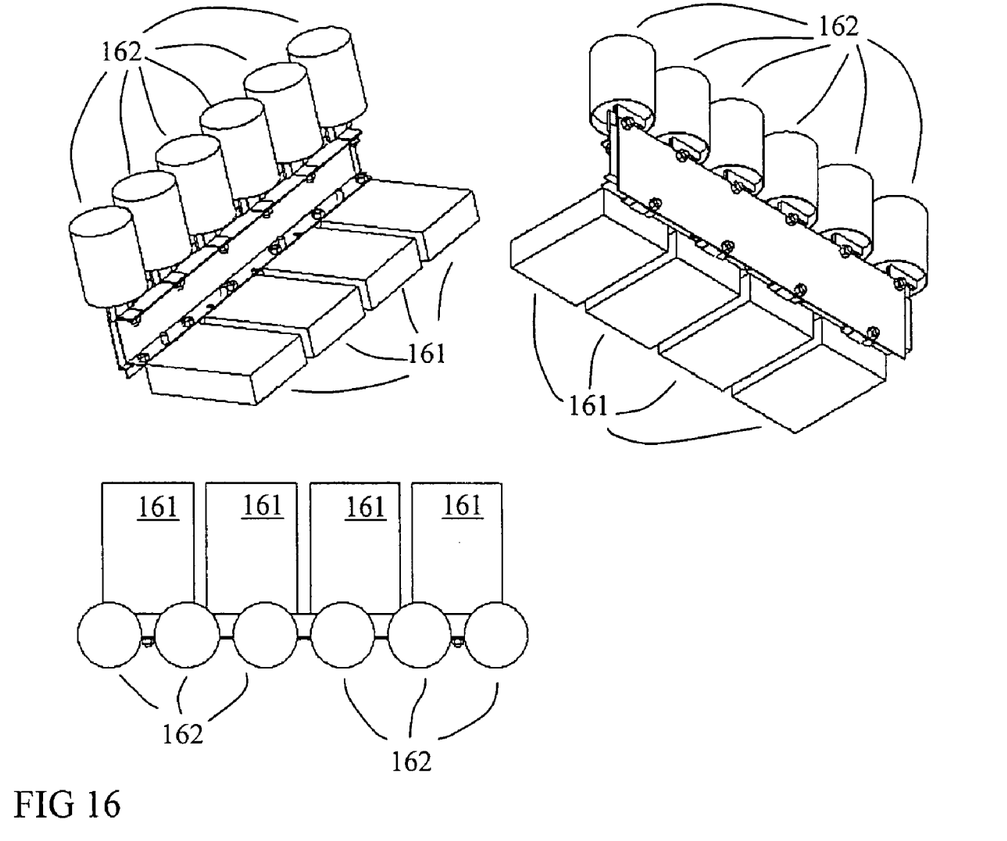

FIG. 16, in turn, shows an embodiment in which ten electric components according to the invention are connected to a single intermediate circuit. Of these components four are shown as IGB transistors or transistor modules 161 and six as capacitors 162.

The connection according to the invention has been described above between an electric component and a busbar system or between an electric component and another electric component. However, the invention is also applicable when busbar systems are connected to each other in a low-inductance manner. FIGS. 1 to 12 can be used as examples of connection forms between busbar systems when the electric components shown are replaced with busbar systems.

In the above explanations of the figures, there is no reference to which of the connections of the electric components or the busbars of the busbar system is positive and which is negative. This has nothing to do with the basic idea of the invention because the polarity can be selected freely. What is essential in the connection and electric component of the invention is that the plus and minus current paths always go as close to each other as possible.

With a connection according to the invention, the physical fastening of the connections can be implemented in a plurality of ways. The most usual connection manners include screw connections, soldering, welding and springback and/or shape force connections. Selection between these is made on the basis of conductor material, connection and conductor geometry and the clamping force required.

In the embodiments explained in connection with the figures, the conductors are busbars. However, any material that conducts well and has a sufficiently large area can serve as conductors. Apart from busbars, such other alternatives include for instance foils, laminations, manufacturing techniques of circuit board, and strips. The insulation means may also be part of the surface material of the conductor.

The insulation means may be manufactured of any electricity-insulating material, and particularly inside components it may be formed of one or more different parts that are either separate or uniform. In accordance with a preferred embodiment of the invention, the shape and structure of the laminar conductors of an electric component and the insulation means between them continue inside the electric component. The fact that the structure continues uniformly or at least partly uniformly inside the component allows manufacturing of a component having lower inductance as before. The clearance and crawling of the components and busbar systems can be reduced if separate insulators can be, with regard to the manufacturing technique, made around the conductors or hermetically connected to each other. The insulation thickness of the insulators depends on the material and the voltage levels in the current path and variations in them.

Further, it is obvious that although, in the context of an electric component, the description refers to an IGB transistor or transistor module, the electric component may be any other switch component, such as an IGCT, a thyristor or a diode. Correspondingly, the description mainly refers to a capacitor in connection with an energy-storing component. It is clear, however, that an energy-storing component may also be an accumulator or the like.

It will be obvious to a person skilled in the art that the basic idea of the invention can be implemented in a plurality of ways. The invention and its embodiments are thus not restricted to the above examples but may vary within the scope of the claims.

The invention claimed is:

1. A connection between electric parts, comprising at least two electric parts to be connected to each other, wherein:
   the first electric part among the at least two electric parts includes a first and a second electrically conducting laminar conductor of the first electric part, which are positioned opposite each other and isolated from each other with a first insulation means; and
   a second electric part among the at least two electric parts includes a first and a second electrically conducting laminar conductor of the second electric component, positioned opposite each other and isolated from each other with a second insulation means, wherein the connection between the electric parts is constituted by
   the first laminar conductor of the first electric part being connected to the first laminar conductor of the second electric part through respective plane surfaces of the first laminar conductors,
   the second laminar conductor of the first electric part being connected to the second laminar conductor of the second electric part through respective plane surfaces of the second laminar conductors, wherein
   the first insulation means of the first electric part comprises a plane surface having at least one of a length and a width extending beyond a corresponding at least one of a length and a width of at least one of the first and second laminar conductors of the first electric part,
   the second insulation means of the second electric part comprises a plane surface having at least one of a length and a width extending beyond a corresponding at least one of a length and a width of at least one of the first and second laminar conductors of the second electric part,
   the insulation means of the first and the second electric parts are arranged to form a continuous insulation layer between the first laminar conductors of the first and the second electric parts and the second laminar conductors of the first and the second electric parts, and
   the laminar conductors of the connection are arranged to form a continuous laminar structure.

2. A connection according to claim 1, wherein at least one of the electric parts is an electric component having a first connector and a second connector which include the first laminar conductor and the second laminar conductor, respectively.

3. A connection according to claim 1, wherein at least one of the electric parts is a voltage busbar system of a direct-voltage intermediate circuit, and wherein
   the first and second laminar conductors of the at least one of the electric parts include voltage busbars.

4. A connection according to claim 1, wherein at least one of the laminar conductors of at least one of the electric parts comprises a connection member, wherein
   the laminar conductor arranged to be connected to the at least one of the laminar conductors comprises a counterpart suitable for said connection member to implement the connection.

5. A connection according to claim 4, wherein the connection member is a screw cap formed on the plane surface of the laminar conductor, and the counterpart of the connection member is a hole or groove formed in the laminar conductor.

6. A connection according to claim 1, wherein the first laminar conductor of one of the electric parts comprises a start portion and a final portion, the final portion being arranged substantially at an angle of 90 degrees relative to the start portion.

7. A connection according to claim 6, wherein the insulation means extends between the laminar conductors of the one of the electric parts substantially over the distance of the start portion of said first laminar conductor, and the second laminar conductor is shorter than the first laminar conductor and the insulation means.

8. A connection according to claim 1, wherein the first electric part comprises a direct-voltage intermediate circuit of a frequency converter, and
   the second electric part comprises a component connected to the direct-voltage intermediate circuit.

9. An electric component, comprising:
   connectors for connecting the electric component, the connectors including a first electrically conductive laminar conductor and a second electrically conductive laminar conductor, which are positioned opposite each other, and which each have a respective plane surface having a length and a width; and
   an insulation means that isolates the first and second laminar conductors from each other, wherein
   the electric component is arranged to be connected through the plane surfaces of the laminar conductors, wherein
   the insulation means is arranged between the first and second laminar conductors, and wherein
   the insulation means comprises a plane surface having at least one of a length and a width extending beyond a corresponding at least one of the length and the width of at least one of the first and second laminar conductors.

10. An electric component according to claim 9, wherein the plane surface of the insulation means is arranged to receive a corresponding plane surface of an insulation means of a structure to be connected to the electric component.

11. An electric component according to claim 9, wherein the electric component is a switch component.

12. An electric component according to claim 9, wherein the electric component is a switch component module.

13. An electric component according to claim 9, wherein the electric component is a capacitor.

14. An electric component according to claim 9, wherein the electric component is an IGB transistor.

15. An electric component according to claim 9, wherein the laminar conductors and the insulation means between the laminar conductors are each arranged to continue at least partly inside the electric component.

16. A connection according to claim 2, wherein at least one of the electric parts is a voltage busbar system of a direct-voltage intermediate circuit, and wherein
   the first and second laminar conductors of the at least one of the electric parts include voltage busbars.

17. A connection according to claim 16, wherein at least one of the laminar conductors of at least one of the electric parts comprises a connection member, wherein
   the laminar conductor arranged to be connected to the at least one of the laminar conductors comprises a counterpart suitable for said connection member to implement the connection.

18. A connection according to claim 17, wherein the first laminar conductor of one of the electric parts comprises a start portion and a final portion, the final portion being arranged substantially at an angle of 90 degrees relative to the start portion.

19. A connection according to claim 18, wherein the first electric part comprises a direct-voltage intermediate circuit of a frequency converter, and
the second electric part comprises the component, wherein the component is connected to the direct-voltage intermediate circuit.

20. A connection according to claim 19, wherein the first and second laminar conductors of the at least one of the electric parts and the insulation means of the at least one of the electric parts is arranged to continue at least partly inside the electric component.

* * * * *